(12) United States Patent
Hellberg et al.

(10) Patent No.: US 10,593,203 B2
(45) Date of Patent: Mar. 17, 2020

(54) METHOD AND SYSTEM FOR HANDLING VEHICLE FEATURE INFORMATION

(71) Applicant: Volvo Car Corporation, Göteborg (SE)

(72) Inventors: Oliver Hellberg, Göteborg (SE); Isabell Oskarsson, Göteborg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 16/185,114

(22) Filed: Nov. 9, 2018

(65) Prior Publication Data

US 2019/0147740 A1    May 16, 2019

(30) Foreign Application Priority Data

Nov. 10, 2017 (EP) ..................... 17201140

(51) Int. Cl.
*G08G 1/09* (2006.01)
*G08G 1/0967* (2006.01)
*B60K 35/00* (2006.01)
*G08G 1/0962* (2006.01)
*G08G 1/01* (2006.01)

(52) U.S. Cl.
CPC ........... *G08G 1/0967* (2013.01); *B60K 35/00* (2013.01); *G08G 1/0137* (2013.01); *G08G 1/093* (2013.01); *G08G 1/0962* (2013.01); *B60K 2370/161* (2019.05)

(58) Field of Classification Search
CPC .... G08G 1/0967; G08G 1/0962; G08G 1/093; B60W 50/08; B60W 50/14; B60W 40/08; B60W 30/18; B60W 2540/28; B60W 2520/10; B60W 2050/146; B60W 2710/30; B60W 2520/00; B60W 2040/0809; B60K 35/00; B60K 2370/736; B60K 2370/161; B60K 2370/1868; G06Q 30/00; G06Q 30/0265; G07C 5/0808
USPC ........... 340/905, 457, 438, 439; 701/31.4, 2, 701/32.6; 455/423
See application file for complete search history.

(56) References Cited

U.S. PATENT DOCUMENTS 6,249,720 B1 * 6/2001 Kubota ............... B60R 16/0232
                                                                      340/990
10,108,191 B2 * 10/2018 Pilluti .................... B60W 30/18
2003/0144775 A1    7/2003 Klausner
(Continued)

FOREIGN PATENT DOCUMENTS

DE      102015213679 A1    1/2017
WO      2007090593 A1    8/2007

OTHER PUBLICATIONS

May 25, 2018 European Search Report issue on International Application No. EP17201140.

*Primary Examiner* — Anh V La
(74) *Attorney, Agent, or Firm* — Clements Bernard Walker; Christopher L. Bernard (57) ABSTRACT

The embodiments herein relate to a method performed by a vehicle system for handling vehicle feature information. The vehicle system monitors a current condition related to a vehicle, and compares the current condition with a predetermined condition. The vehicle system provides vehicle feature information to a user of the vehicle when the comparing indicates that the conditions are at least partly the same.

12 Claims, 4 Drawing Sheets

(56) References Cited

U.S. PATENT DOCUMENTS

2008/0147262 A1\* 6/2008 Daniels .................. G06Q 30/00
  701/31.4
2013/0293367 A1   11/2013 Schalk \* cited by examiner

METHOD AND SYSTEM FOR HANDLING VEHICLE FEATURE INFORMATION

CROSS-REFERENCE TO RELATED APPLICATION

The present patent application/patent claims the benefit of priority of co-pending European Patent Application No. 17201140.5, filed on Nov. 10, 2017, and entitled "METHOD AND SYSTEM FOR HANDLING VEHICLE FEATURE INFORMATION," the contents of which are incorporated in full by reference herein.

TECHNICAL FIELD

Embodiments herein relate generally to a method and a vehicle system performing the method. More particularly the embodiments herein relate to handling vehicle feature information.

BACKGROUND

When purchasing a vehicle, the vehicle handover situation should be remembered as a celebrative and unique experience, whilst the vehicle user, e.g. the purchaser, is also educated about the vehicle's features. Since the number of and complexity of vehicle features are rapidly increasing model by model, it is becoming increasingly complex for users to grasp everything during current handover processes at dealerships. Hence, there is a significant risk that users do not understand the full value of the purchased vehicle. Moreover, driving features such as semi-autonomous features require an understanding and trust from the user and the threshold of trying it out on their own is often too high.

The current handover processes include several elements and are neither adjusted to modern vehicles nor to users, leaving the user confused, stressed and unsatisfied, not understanding the full value of their complex product.

Therefore, there is a need to at least mitigate or solve this issue.

SUMMARY

An objective of embodiments herein is therefore to obviate at least one of the above disadvantages and to provide improved handling of vehicle feature information.

According to a first aspect, the object is achieved by a method performed by a vehicle system for handling vehicle feature information. The vehicle system monitors a current condition related to a vehicle and compares the current condition with a predetermined condition. The vehicle system provides vehicle feature information to a user of the vehicle when the comparing indicates that the conditions are at least partly the same.

According to a second aspect, the object is achieved by a vehicle system for handling vehicle feature information. The vehicle system is adapted to perform the method according to the first aspect.

According to a third aspect, the object is achieved by a vehicle comprising the vehicle system.

Since the vehicle feature information is provided to the user when the conditions are at least partly the same, handling of the vehicle feature information is improved in that they are only presented when it is suitable from a safety perspective.

Embodiments herein afford many advantages, of which a non-exhaustive list of examples follows:

An advantage of the embodiments herein is that they improve the education of the vehicle user about vehicle features since it is done when the conditions are such that it is suitable from a safety perspective.

Another advantage of the embodiments herein is that they improve the education of the vehicle user about vehicle features since it is done when the conditions are such that the feature will perform its best. For example, a vehicle feature such as a pilot assist is at its most stable when there are road markings for a certain distance. In an example where the vehicle feature is a rain sensor, it is most suitable to provide information about the rain sensor when it is raining.

A further advantage of the embodiments herein is that safety in the vehicle is improved since vehicle feature is information is only presented to the user when it is suitable from a safety perspective.

The current condition may comprise vehicle internal data and data from vehicle external systems. Since the decision to provide vehicle feature information is based on both the internal data and the external data, the decision takes into account a large amount of data, which ensures that the vehicle feature information is provided to the user when is ensured that it is safe and the vehicle feature performs in an optimal way.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to presenting relevant vehicle features to a user during suitable driving situations.

Figure 1:
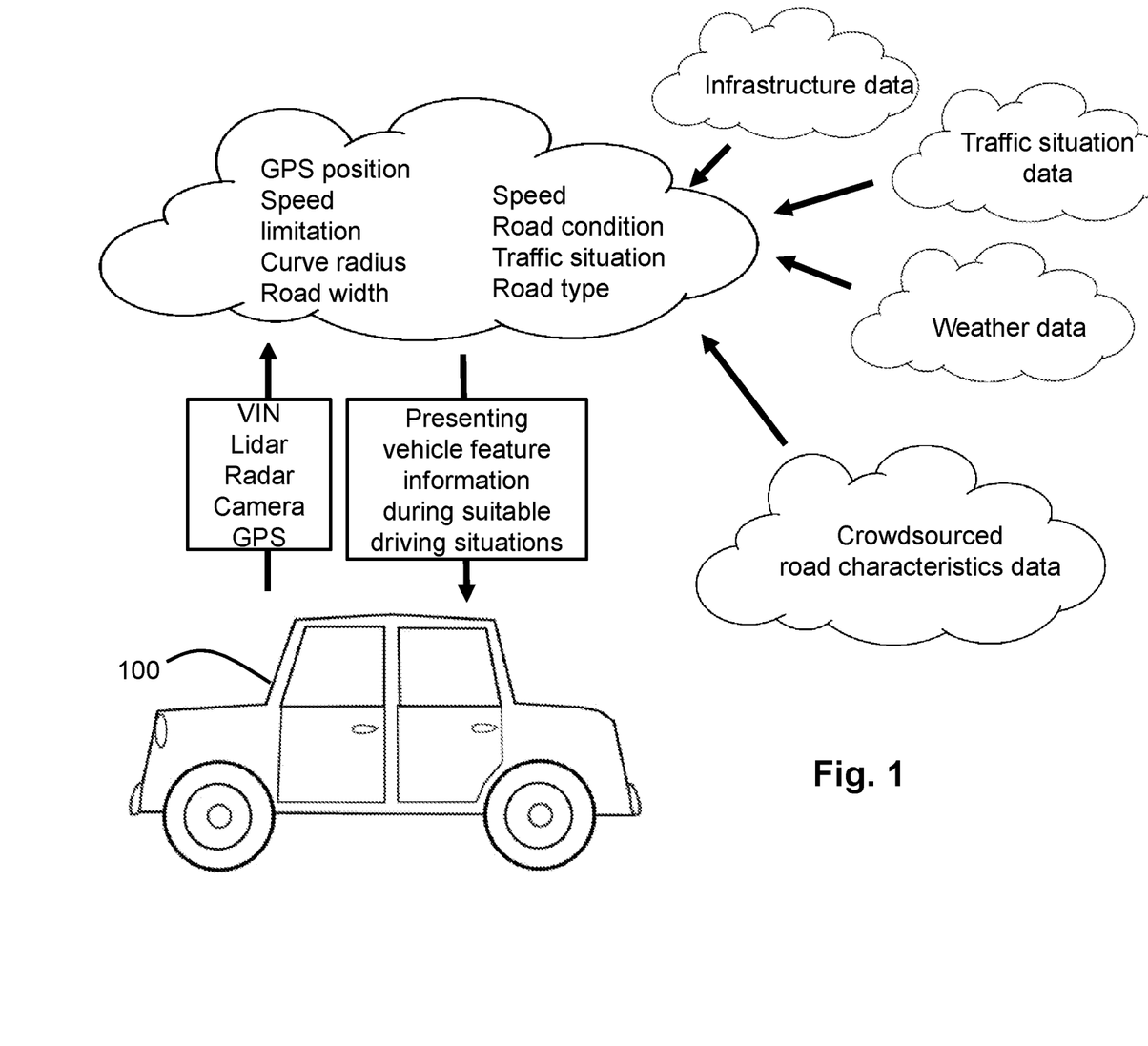
FIG. 1 is a schematic drawing illustrating data transfer.

Today, different information related to the condition of a vehicle is available. FIG. 1 illustrates that a vehicle 100 may be equipped with devices such as Light Detection And Ranging (LIDAR), Radio Detection and Ranging (RADAR), camera, Global Positioning System (GPS) device etc. These devices obtain information related to the conditions of the vehicle 100. For example, the GPS obtains position information of the vehicle 100, the camera obtains information in the form of images of the surroundings of the vehicle 100 and of the user in the vehicle 100 etc. Information from such devices may be stored internally in a memory in the vehicle 100, it may be sent to an external memory for storing, e.g. a memory in the cloud, etc. The information is accessible by a vehicle system comprised in the vehicle 100. Consequently, at least a part of the vehicle 100 is adapted to communicate with the external memory, e.g. using any suitable wireless communication technology. The information may also be referred to as data or parameters.

The vehicle 100 may have a unique identification number such as e.g. a Vehicle Identification Number (VIN). From the unique identification number, the features of the vehicle 100, its specification and manufacturer can be derived. The unique identification number may be stored in a memory internally in the vehicle 100, it may be stored in an external memory, e.g. a memory in the cloud, and it may be stored in a vehicle system. When information from devices and systems such as the LIDAR, radar, camera and navigation device, e.g. GPS, in the vehicle 100 are stored in an external memory, the information may be stored together with the unique identification number in order to associate the information with the particular vehicle 100. The identification number is accessible by a vehicle system comprised in the vehicle 100.

The vehicle 100 may be any arbitrary vehicle, for instance a car, truck, lorry, van, bus, motorcycle etc. The vehicle 100 may be at least partly autonomous or self-driven, it may be completely autonomous or self-driven, or it may be non-autonomous etc. The user of the vehicle 100 may be referred to as a driver, an occupant, a passenger etc.

Data and information from other systems may also be accessible by the vehicle 100, e.g. by a vehicle system comprised in the vehicle 100. Examples of such data are infrastructure data, traffic situation data, weather data, road characteristics data etc. The road characteristics data may be e.g. crowdsourced road characteristics data. These data may be real time dynamic data or statistical data. Such data may be accessible by the vehicle 100 by that the vehicle 100 obtains the data from an external memory, e.g. in the cloud, or directly obtains the data from a respective system providing the data, e.g. directly from a weather system, an infrastructure system etc. These other system may be vehicle external systems or vehicle internal systems.

From vehicle devices and from other systems, information related to the vehicle's condition can be obtained. Examples of such condition information may be position, speed limitation, curve radius, road width, current speed, road condition, traffic situation, road type etc. By evaluating this information related to the vehicle's condition, relevant vehicle features can be presented to the user of the vehicle 100 during suitable driving situations. The road condition may be e.g. wet road, icy road, good, bad, excellent, the traffic situation may be e.g. queue, no queue, good, bad, excellent. The road type may be e.g. highway, countryside.

Figure 2:
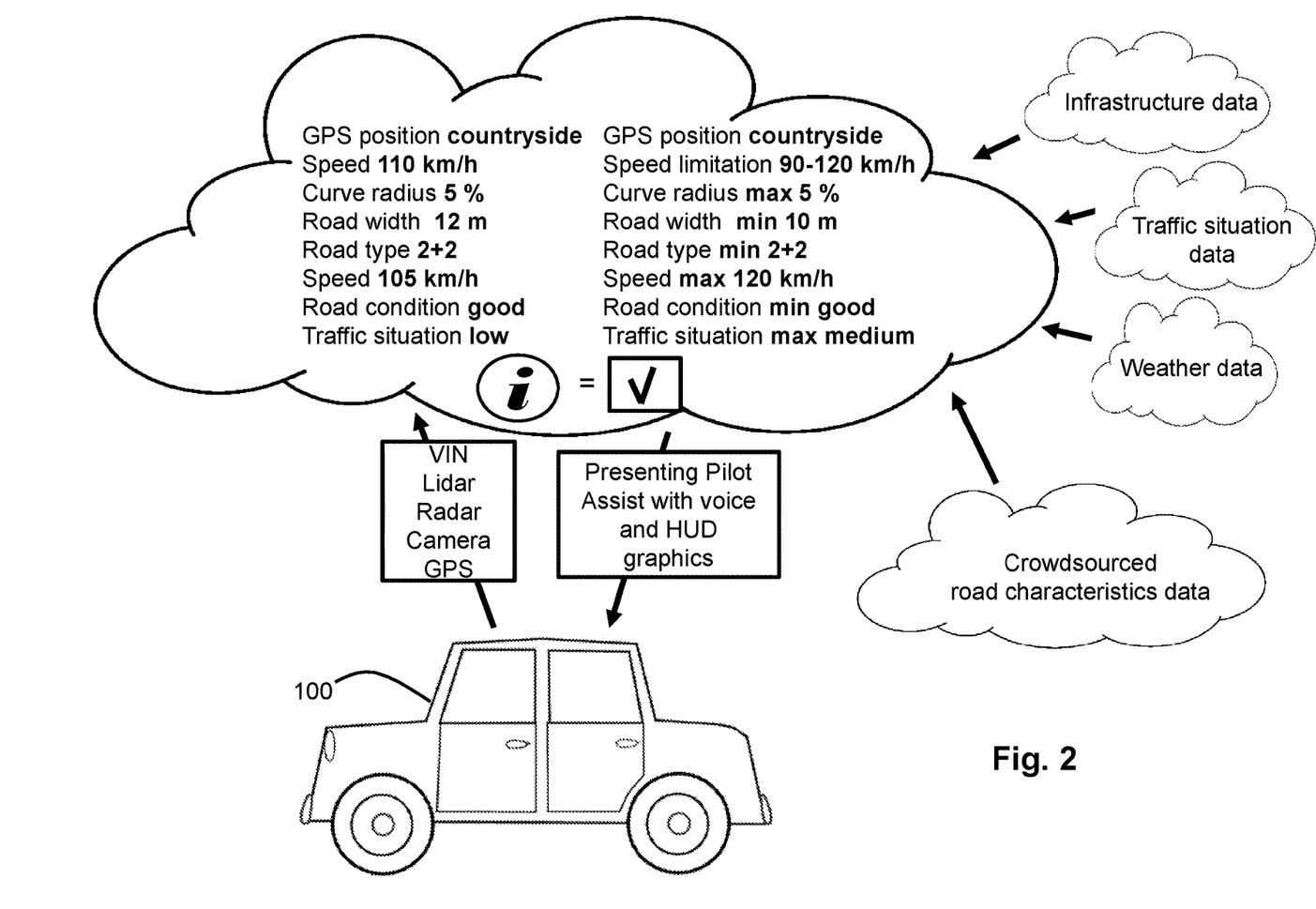
FIG. 2 is a schematic drawing illustrating an example of a method.

One example of a vehicle feature that the user of the vehicle 100 may be informed about is the pilot assist feature. The pilot assist helps the user to drive the vehicle 100 between road lanes whilst at the same time maintaining a preselected time interval to the preceding vehicle. FIG. 2 illustrates an example where the pilot assist is the feature that should be presented to the user. The vehicle 100 has a unique VIN and comprises vehicle devices such as LIDAR, radar, camera and GPS. As mentioned above, these vehicle devices obtain information related to the vehicle's condition. This information is accessible by a vehicle system comprised in the vehicle 100 (the vehicle system will be described in more detail later). In addition, data such as infrastructure data, traffic situation data, weather data and crowd sourced road characteristics data are also accessible by the vehicle system.

The vehicle system may comprise or obtain information of predetermined conditions for when information about the pilot assist should be provided to the user of the vehicle 100. In the example illustrated in FIG. 2, the conditions are as follows:
  GPS position: Countryside
  Speed limitation: 90-120 km/h
  Curve radius: Max 5%
  Road width: Min 10 m
  Road type: Min 2+2
  Speed: Max 120 km/h
  Road condition: Min good
  Traffic situation: Max medium The vehicle system monitors the current conditions of the vehicle 100 and at one time instance the current conditions may have the following values:
  GPS position: Countryside
  Speed limitation: 110 km/h
  Curve radius: 5%
  Road width: 12 m
  Road type: 2+2
  Speed: 105 km/h
  Road condition: Good
  Traffic situation: Low When comparing the current conditions with the predetermined conditions, it is seen that the current conditions in the example in FIG. 2 fulfil the predetermined conditions, i.e. the current conditions are within the range of the predetermined conditions or they are at least partly the same. At least partly the same may also be described as substantially the same. Consequently, vehicle feature information for the pilot assist is provided to the user by for example using voice and graphics, e.g. Head-Up Display (HUD) graphics. The purpose of providing the vehicle feature information to the user is to educate him about the particular feature.

The method for handling vehicle feature information performed by the vehicle system, according to some embodiments will now be described with reference to the flowchart depicted in FIG. 3. The method comprises at least one of the following steps, which steps may as well be carried out in another suitable order than described below:

Step 301

The vehicle system monitors a current condition related to a vehicle 100. The monitoring may be performed by obtaining information from vehicle devices such as e.g. LIDAR, radar, camera, GPS etc., by obtaining information from other systems such as infrastructure systems, weather system etc. The monitored current condition may be represented by a number of parameters comprised in the obtained information. The conditions are related to the vehicle 100 in that they relate to at least one of the vehicle internal conditions and/or the vehicle's outside surroundings.

The current condition may be continuously monitored in real time, at regular intervals or upon request from another vehicle system, from the user etc.

The conditions may be associated with at least one of the following: a vehicle position, speed limitation, curve radius, road width, road type, speed, road condition, traffic situation, weather and light conditions etc.

The current condition may be monitored in real time.

Step 302

The vehicle system compares the current condition with a predetermined condition. The predetermined condition may be provided to the vehicle system when the vehicle 100 is manufactured, it may be uploaded to the vehicle system at a certain time instance etc. The predetermined condition may be static for the whole lifetime of the vehicle 100 or it may be updated at regular intervals. The predetermined condition may be determined by the vehicle manufacturer. The predetermined conditions are related to the vehicle 100. The predetermined condition may comprise predetermined information, data, parameters etc.

The predetermined condition may be a condition within which it is suitable from a safety perspective to provide vehicle feature information to the user.

Information indicating the predetermined condition may be vehicle internal information, or externally obtained information, or both vehicle internal information and externally obtained information.

There may be different predetermined conditions for different vehicle features. For example, predetermined condition A may be associated with vehicle features 1, 2 and 3, predetermined condition B may be associated with vehicle features 3 and 4 and predetermined condition C may be associated with vehicle feature 5. Thus, the vehicle system may determine which predetermined condition among a set of predetermined conditions that should be applied at a certain time or for certain current conditions. For example, the vehicle feature of steering wheel heating may be associated with the predetermined condition A which comprises that the temperature of the vehicle compartment is below 5° C. and that the vehicle speed is maximum 60 km/h. The vehicle feature of the pilot assist may be associated with predetermined condition B which comprises that the speed limitation should be in the range of 90-120 km/h and that the curve radius should be max 5%.

When there are two or more vehicle features which the user should be provided information about, the vehicle feature information may be presented in a predetermined order, according to some criteria or randomly.

The comparison may be continuously performed, it may be triggered by the vehicle system itself, from another vehicle system, it may be performed on regular basis etc.

In order to be able to perform the comparison, the predetermined condition and the current condition may be at least partly the same condition.
For example, when the predetermined condition is related to road type, then the current condition also needs to be related to road type. In one example, the predetermined condition may comprise three different parameters and the current condition comprises two of the same parameters as the predetermined condition parameters. In one example, the predetermined condition and the current condition are the same.

Step 303
The vehicle system may determine a type of the vehicle feature that the user should be informed about. The vehicle 100 may comprise a plurality of vehicle features, e.g. pilot assist, park assist, steering wheel heating, pedestrian detection etc. The type of vehicle feature may be determined based on the monitored current condition, based on which vehicle features that has been previously presented to the user, based on that the user has previously or is currently operating the vehicle feature in a way that does not correspond to the intended way, that the particular vehicle feature has not previously been activated or used by the user etc.

Step 304
The vehicle system provides vehicle feature information to a user of the vehicle 100 when the comparing indicates that the current condition and the predetermined condition are at least partly the same. When the conditions are at least partly the same, it is suitable to provide the vehicle feature information to the user from a safety perspective. It is safe because the predetermined conditions are set in such safe way. In other words, the vehicle feature information is provided to the user when the conditions are at least safe.

The provided vehicle feature information may be for the determined type of vehicle feature which was determined in step 303.

The vehicle feature information may be provided to the user when the current condition and the predetermined condition are at least partly the same and when the vehicle feature information has not been previously provided to the user.

The vehicle feature information may be provided when the current condition and the predetermined condition are at least partly the same and when the vehicle feature associated with the vehicle information is currently operated or has been previously operated by the user in an unintended or suboptimal manner or if the vehicle feature has not previously been activated, i.e. activated by the vehicle 100 or by the user of the vehicle 100.

The vehicle feature information may be provided to the user in at least one of the following ways:
by displaying the information on a display, and/or
by using an audio device, and/or
by using a haptic device.

Thus, the vehicle feature information may be in the form of audio data, e.g. voice, and/or image data, e.g., image, video, and/or text data and/or haptic information, e.g. seat vibration, steering wheel vibration, tactile information. The vehicle feature information may be provided to the user e.g. by transmitting audio data and/or image data and/or haptic data to the audio device and/or the display and/or haptic device in order for it to be perceivable by the user.

The audio device, e.g. a speaker, may be an audio device integrated in the vehicle 100, it may be an audio device in a User Equipment (UE) located in the vehicle 100, e.g. the user's mobile phone or tablet computer etc. The display may be a vehicle display integrated in the vehicle 100, it may be a display on a UE located in the vehicle 100, e.g. the user's mobile phone or tablet computer etc., or any other suitable display. The UE may be e.g. mobile phone, smart phone, sensors, meters, household appliances, medical appliances, media players, cameras, Machine to Machine (M2M) device or any type of consumer electronic, for instance but not limited to television, radio, lighting arrangements, tablet computer, laptop or Personal Computer (PC). The UE may be portable, pocket storable, hand held, computer comprised, or vehicle mounted devices, enabled to communicate voice and/or data, via a radio access network, with another entity, such as another UE or a server. The UE may belong to the user of the vehicle 100.

With the provided vehicle feature information, the user learns how to operate the vehicle 100. The user is provided with vehicle feature information in a way that distracts him as little as possible.

With the provided vehicle feature information, the user learns how to use the vehicle 100 at least partly without assistance from a salesman.

Figure 3:
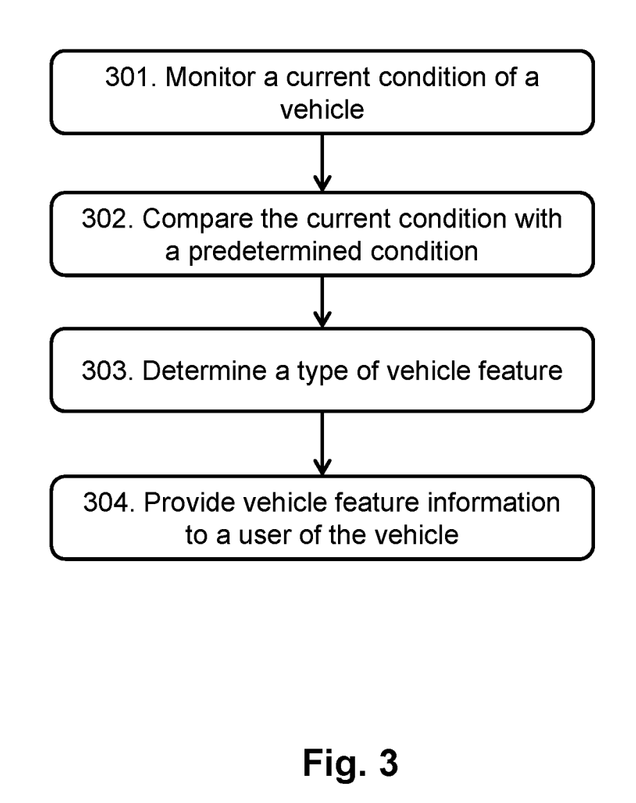
FIG. 3 is a flow chart illustrating an example of a method.
Figure 4:
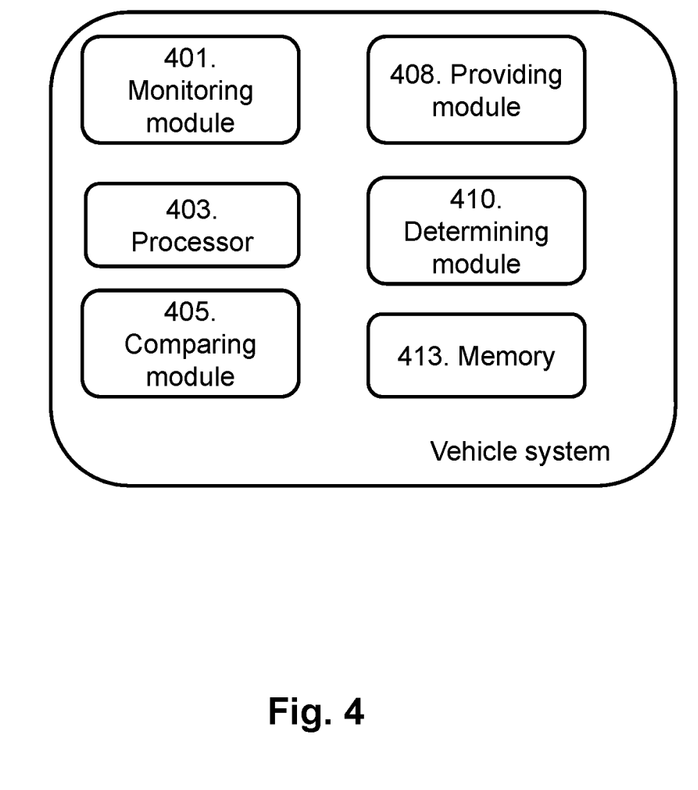
FIG. 4 is a schematic block diagram illustrating an example of a vehicle system.

To perform the method steps shown in FIG. 3 for for handling vehicle feature information, the vehicle system may comprises an arrangement as shown in FIG. 4. The vehicle system may be comprised in the vehicle 100.

The vehicle system is adapted to, e.g. by means of a monitoring module 401, monitor a current condition related to the vehicle 100. The conditions may be associated with at least one of the following: a vehicle position, speed limitation, curve radius, road width, road type, speed, road condition, traffic situation, weather and light conditions. The monitoring module 401 may also be referred to as a monitoring unit, a monitoring means, a monitoring circuit, means for monitoring etc. The monitoring module 401 may be a processor 403 or comprised in the processor 403 of the vehicle system.

The vehicle system is adapted to, e.g. by means of a comparing module 405, compare the current condition with a predetermined condition. The predetermined condition may be a condition within which it is suitable from a safety perspective to provide vehicle feature information to the user. Information indicating the predetermined condition may be vehicle internal information, or externally obtained information, or both vehicle internal information and externally obtained information. There may be different predetermined conditions for different vehicle features. The comparing module 405 may also be referred to as a comparing unit, a comparing means, a comparing circuit, means for comparing etc. The comparing module 405 may be the processor 403 or comprised in the processor 403 of the vehicle system.

The vehicle system is adapted to, e.g. by means of a providing module 408, provide vehicle feature information to a user of the vehicle 100 when the comparing indicates that the current condition and the predetermined condition are at least partly the same. The vehicle feature information may be provided when the current condition and the predetermined condition are at least partly the same and when the vehicle feature information has not been previously provided to the user. The vehicle feature information may be provided when the current condition and the predetermined condition are at least partly the same and when the vehicle feature associated with the vehicle information is currently operated or has been previously operated in an unintended or suboptimal manner or if the vehicle feature has not previously been activated. The vehicle feature information may be provided to the user by displaying the information on a vehicle display or by providing the information using an audio device or a haptic device, or by providing the information both on the vehicle display and using the audio device and the haptic device. The providing module 408 may also be referred to as a providing unit, a providing means, a providing circuit, means for providing etc. The providing module 408 may be the processor 403 or comprised in the processor 403 of the vehicle system.

The vehicle system may be adapted to, e.g. by means of a determining module 410, determine a type of vehicle feature about which vehicle feature information should be provided to the user. The provided vehicle feature information may be for the determined type of vehicle feature.

In some embodiments, the vehicle system comprises a memory 413. The memory 413 comprises instructions executable by the processor 403.

The present mechanism for handling vehicle feature information may be implemented through one or more processors, such as a processor 403 in the vehicle system arrangement depicted in FIG. 4, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the vehicle system. One such carrier may be in the form of a CD ROM disc. It is however feasible with other data carriers such as a memory stick. The computer program code can furthermore be provided as pure program code on a server and downloaded to the vehicle system.

In some embodiments, a computer program may comprise instructions which, when executed on at least one processor, cause the at least one processor to carry out at least one of the method steps 301-304. A carrier may comprise the computer program, and the carrier is one of an electronic signal, optical signal, radio signal or computer readable storage medium.

The vehicle 100 comprises the vehicle system as described above with reference to FIG. 4.

The embodiments herein enable presentation of vehicle features and educating the vehicle user about these during suitable road conditions. Thus, educating the user and creating additional value in respect to vehicle products and services whilst emphasizing features of the vehicle. For instance, presenting the Pilot Assist feature when external road characteristics allow the user to safely try-out the feature. Information from vehicle data, geographical location, and municipal infrastructure plans are utilized to identify the relevant vehicle feature to present and assess if current conditions allow for presenting features to the user.

The embodiments herein are not limited to the above described embodiments. Various alternatives, modifications and equivalents may be used. Therefore, the above embodiments should not be taken as limiting the scope of the embodiments, which is defined by the appending claims. A feature from one embodiment may be combined with one or more features of any other embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The terms "consisting of" or "consisting essentially of" may be used instead of the term comprising.

The term "adapted to" used herein may also be referred to as "arranged to", "configured to", "capable of" or "operative to".

It should also be emphasised that the steps of the methods defined in the appended claims may, without departing from the embodiments herein, be performed in another order than the order in which they appear in the claims.

The invention claimed is:

1. A method performed by a vehicle system for handling vehicle feature information, the method comprising:
    monitoring a current condition related to a vehicle using one or more of a sensor, a camera, and a navigation device;
    comparing the current condition with a predetermined condition; and
    providing vehicle feature information to a user of the vehicle when the comparing indicates that the current condition and the predetermined condition are at least partly the same and when the current condition is determined to correspond to a safe time to provide the vehicle feature information to the user of the vehicle, wherein the vehicle feature information is educational information that is related to a vehicle feature that is applicable in the current condition.

2. The method according to claim 1, further comprising:
    determining a type of vehicle feature about which vehicle feature information should be provided to the user; and wherein the provided vehicle feature information is for the determined type of vehicle feature.

3. The method according to claim 1, wherein the vehicle feature information is provided when the current condition and the predetermined condition are at least partly the same and when the vehicle feature information has not been previously provided to the user.

4. The method according to claim 1, wherein the vehicle feature information is provided when the current condition and the predetermined condition are at least partly the same and when the vehicle feature associated with the vehicle information is currently operated or has been previously operated in an unintended or suboptimal manner or if the vehicle feature has not previously been activated.

5. The method according to claim 1, wherein the current condition and the predetermined condition are associated with at least one of the following: a vehicle position, speed limitation, curve radius, road width, road type, speed, road condition, traffic situation and weather and light conditions.

6. The method according to claim 1, wherein information indicating the predetermined condition is vehicle internal information, or externally obtained information, or both vehicle internal information and externally obtained information.

7. The method according to claim 1, wherein the vehicle feature information is provided to the user in at least one of the following ways: by displaying the information on a display, by using an audio device and by using a haptic device.

8. The method according to claim 1, wherein there are different predetermined condition for different vehicle features.

9. A vehicle system for handling vehicle feature information, wherein the vehicle system is adapted to perform the method according to claim 1.

10. A vehicle comprising the vehicle system according to claim 9.

11. A computer program comprising instructions which, when executed on at least one processor, cause the at least one processor to carry out the method according to claim 1.

12. A carrier comprising the computer program of claim 11, wherein the carrier is one of an electronic signal, optical signal, radio signal or computer readable storage medium.

* * * * *